United States Patent [19]

Klak et al.

[11] Patent Number: 5,664,547
[45] Date of Patent: Sep. 9, 1997

[54] FLAME GLOW PLUG FOR A DIESEL ENGINE

[75] Inventors: Roland Klak, Ostfildern; Martin Eller, Ludwigsburg; Helmut Buck, Erdmannshausen, all of Germany

[73] Assignees: Mercedes Benz AG, Stuttgart; BERU, Ruprecht GmbH & Co. KG, Ludwigsburg, both of Germany

[21] Appl. No.: 596,466

[22] Filed: Feb. 5, 1996

[30] Foreign Application Priority Data

Feb. 25, 1995 [DE] Germany ............ 195 06 711.8

[51] Int. Cl.⁶ .......... F02N 17/047; F02M 31/00; F02P 19/04; F23Q 7/00
[52] U.S. Cl. ............ 123/549; 123/550; 123/179.21
[58] Field of Search ............ 123/550, 549, 123/179.21; 219/270

[56] References Cited

U.S. PATENT DOCUMENTS

| | | | |
|---|---|---|---|
| 5,040,497 | 8/1991 | Dingle | 123/179.21 |
| 5,130,517 | 7/1992 | Schmid et al. | 123/550 |
| 5,182,437 | 1/1993 | Schmid et al. | 123/179.21 |
| 5,216,990 | 6/1993 | Moosmann et al. | 123/179.21 |

FOREIGN PATENT DOCUMENTS

| | | |
|---|---|---|
| 1 526 780 | 12/1969 | Germany. |
| 41 42 195 | 6/1993 | Germany. |

*Primary Examiner*—Marguerite McMahon
*Attorney, Agent, or Firm*—Klaus J. Bach

[57] ABSTRACT

In a flame glow plug for a Diesel engine with an insert structure mounted on the plug body for the supply of fuel thereto, wherein the plug body includes in a vaporizing tube, a heating rod arranged in spaced relationship to the vaporizing tube such that an annular gap remains in which a vaporizing sieve is disposed and the heating rod extends axially beyond the vaporizing tube and is protected there by a flame tube firmly mounted on the plug and projecting into the intake airflow path when the glow plug is installed in an engine, the flame tube has circumferentially spaced air inlet openings and the vaporizing tube extends to the air inlet openings of the flame tube, the vaporizing tube further has a collar forming a narrow annular gap around the heating rod for supporting the vaporizing sieve and preventing flame backflashing through the gap and at least one row of openings arranged circumferentially below the collar.

5 Claims, 2 Drawing Sheets

FLAME GLOW PLUG FOR A DIESEL ENGINE

BACKGROUND OF THE INVENTION

The invention relates to a flame glow plug for a Diesel engine including a vaporizer tube receiving a heating rod comprising a heating and a control spiral, a flame tube for the protection of the end of heating rod extending from the vaporizer tube and a vaporizer sieve arranged between the vaporizer tube and the heating rod.

Such a flame glow plug with an insert in the plug housing for the supply of fuel, with a vaporizer sieve arranged between a vaporizer tube and a heating rod and a flame tube for the protection of the heating rod projecting from the vaporizer tube is known from DE 4,142,195 C2. The flame tube of this flame glow plug is provided with inlet flow passages and the vaporizer tube includes gill-like recesses for the enhancement of premixing the inlet air with the fuel vapor. The fuel is supplied by way of a dosing insert which is attached to the side of the plug housing.

It is the object of the present invention to provide a flame glow plug with improved flame stability and increased life.

SUMMARY OF THE INVENTION

In a flame glow plug for a Diesel engine with an insert structure mounted on the plug body for the supply of fuel thereto, wherein the plug body includes, in a vaporizing tube, a heating rod arranged in spaced relationship with the vaporizing tube such that an annular gap remains in which a vaporizing sieve is disposed and the heating rod extends axially beyond the vaporizing tube and is protected there by a flame tube firmly mounted on the plug and projecting into the intake air flow path when the glow plug is installed in an engine, the flame tube has circumferentially spaced air inlet openings and the vaporizing tube extends to the air inlet openings of the flame tube and has a collar forming a narrow annular gap around the heating rod for supporting the vaporizing sieve and preventing flame backflashing through the gap and at least one row of openings arranged circumferentially in the end portion of the vaporizing tube below the collar which defines an air-fuel vapor mixing chamber.

By providing an annular gap adjacent a section of the heating rod adjacent the mixing chamber, better vaporization of the fuel is obtained and further, by the particular arrangement of at least one row of flow passages in the vaporizing tube, a better fuel vapor air mixture and scavenging and cooling of the mixing chamber are obtained and, in addition, backflashing of the flame and entering of combustion air from the mixing chamber into the vaporizing chamber are prevented. Oxidation of the fuel in the vaporizing chamber is therefore avoided.

Also, because of the improved cooling effect, reliable operation of the temperature sensitive heating rod is achieved.

In order to avoid exposure of the end of the heating rod, that is of the heating rod tip, to excessive temperatures which would detrimentally affect the life of the heating rod, the flame tube has, at its edges adjacent the combustion chamber, means for generating turbulence which, as shown, are gill-like cutouts via which the intake air flows into the flame tube interior in a turbulent fashion whereby the formation of temperature peaks at the heating rod tip is avoided.

By a particular arrangement of a fuel supply jet screw which delivers the fuel in a tangential fashion onto grooves formed in the heating rod, the fuel is highly atomized so that the flame glow plug remains free of carbon deposits over a long period of operation.

An embodiment of the invention will be described below in greater detail on the basis the accompanying drawings.

DESCRIPTION OF A PREFERRED EMBODIMENT

Figure 1:
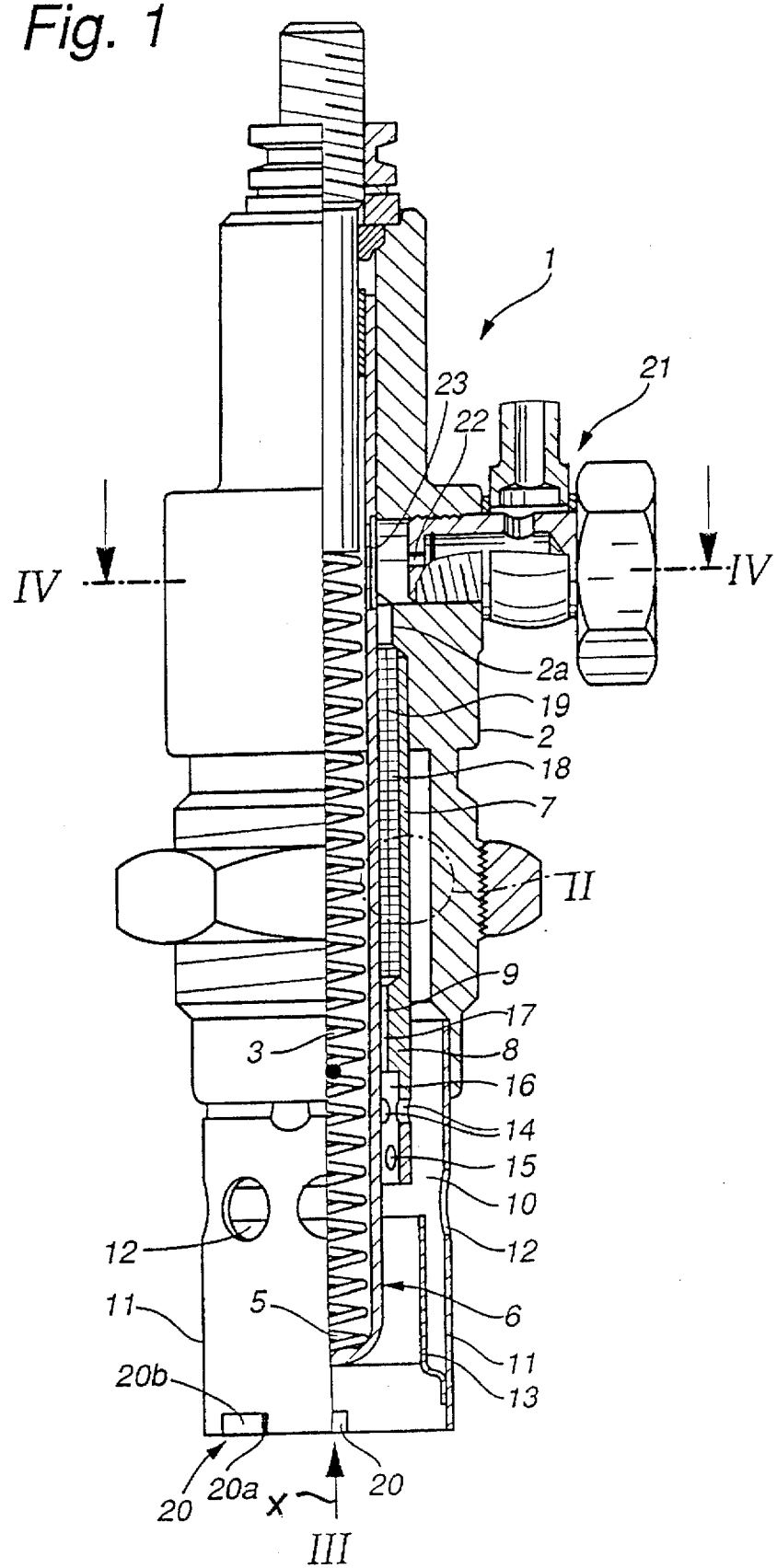
FIG. 1 is a longitudinal cross-sectional view of a flame glow plug according to the invention.

A flame glow plug 1 as shown in FIG. 1 which is used in a Diesel engine to facilitate starting and, after start-up, to smoothen engine operation until the coolant and the cylinders have reached a certain temperature, comprises a plug housing 2 including a heating rod 6 having a control coil 3 and a heating coil 5, a vaporizing tube 7 surrounding the heating rod 6 in spaced relationship, a flame tube 11 defining an annular space 10 around the heating rod 6 and an inner tube 13 firmly connected to the flame tube 11 by three webs 13a. The vaporizing tube 7 is provided with an inner collar 8 extending within the vaporizing tube 7 adjacent a section of the control coil near a mixing chamber 16 to provide for a narrow annular gap 9. The flame tube 11 has flow passages 12 for the inflow of air and the inner tube 13 extends upwardly to the flow passages 12.

Figure 2:
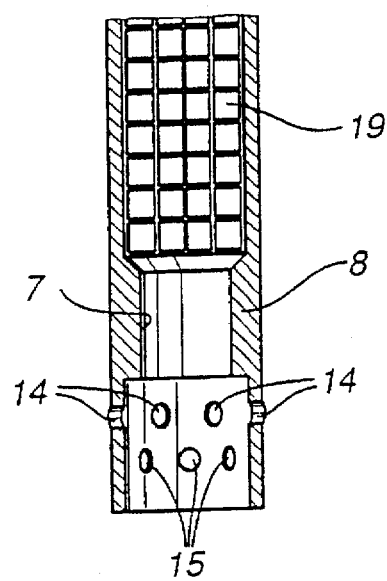
FIG. 2 shows a vaporization tube of the flame glow plug of FIG. 1 with two rows of passages arranged on top of one another.

When the plug is mounted on an engine the flame tube 11 is disposed in the flow path of the intake air and protects the heating rod 6 projecting from the vaporizing tube 7. The vaporizing tube 7 extends downwardly to the flow passages 12 of the flame tube 11 and has, at its lower end below the inner collar 8, two rows of openings 14 which are arranged around the flame tube 11 and are disposed on top of one another. The openings of one row are circumferentially displaced with respect to those of the other row (FIG. 2). They provide for a good air-vapor mixture and also for intense scavenging and cooling of the mixing chamber 16 defined between the lower end of the vaporizing tube 7 and the heating rod 6.

The narrow annular gap 9 defined by the collar 8 prevents the flame from flashing back and it also prevents combustion air from entering the vaporizing chamber 17 arranged above, or upstream of, the mixing chamber 16. The narrow annular gap 9 preferably has a gap width of 0.6 mm and the heating rod has a diameter of about 7.6 mm.

The heating rod 6 and the vaporizing tube 7 together define an annular intermediate space 18 in which a vaporizing sieve 19 consisting of a single layer of a thick wire fabric is disposed and which serves as vaporizing zone. The vaporizing sieve 19 which is loosely disposed in the intermediate space 18 and which abuts the heating rod 6 as well as the vaporizing tube 7 is supported on the collar 8 of the vaporizing tube 7 and is limited at its upper end by an inward projection 2a formed in the upper part of the glow plug housing 2.

Figure 3:
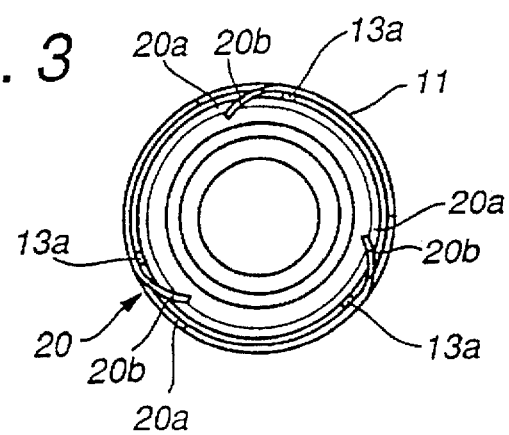
FIG. 3 shows cutouts formed in the flame tube end in a bottom view of the flame glow plug in the direction x of FIG. 1.
Figure 4:
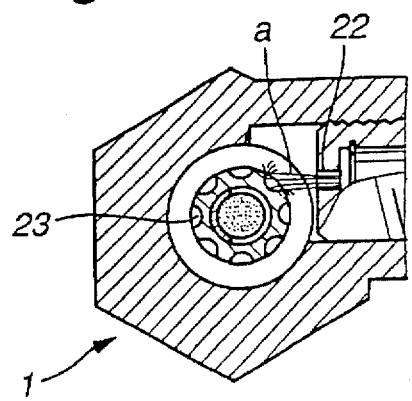
FIG. 4 is cross-sectional view along line IV—IV of FIG. 1 showing in its center the heating rod with its longitudinal grooves

The flame tube 11 has, at its end adjacent the combustion chamber, gill-like indentations 20 (FIG. 3) formed by inwardly bent wall portions 20b of the flame tube 11 which define in-flow openings 20a adapted to direct part of the intake air inwardly for cooling the tip of the heating rod which is subject to high temperatures.

Fuel is supplied by way of an insert structure 21 which is a hollow jet screw extending transverse to the flame glow plug 1. The insert structure 21 is arranged so as to be displaced sidewardly so that the fuel jet discharged from a jet passage 22 of the insert structure impinges tangentially onto a section of the heating rod 6 which is provided with axially extending longitudinal grooves 23. The increased surface generated by the grooves provides for an improved atomization of the fuel. The finely atomized fuel is rapidly vaporized in the vaporizing tube 7 which results in a reduction of carbon deposits in the flame glow plug 1.

What is claimed is:

1. A flame glow plug for a Diesel engine comprising: a cylindrical glow plug body, an insert structure mounted on said glow plug body for supplying fuel thereto, a heating rod centrally disposed in said cylindrical glow plug body and being mounted thereto at one end and having an opposite free end, said heating rod including a heating coil and, adjacent its free end, a control coil, a full vaporizing tube surrounding said heating rod in spaced relationship therefrom so as to form an annular intermediate space therebetween receiving a vaporizing sieve, a flame tube connected to said plug body and having a free end extending axially beyond said heating rod so as to be disposed in the path of the intake air when said glow plug is installed in an engine for protecting the free end of said heating rod, said flame tube having flow passages formed therein and an inner tube extending from said free end of said flame tube backwards up to said flow passages and having a diameter larger than the diameter of said vaporizing tube, said vaporizing tube extending axially down to said flow passages and defining with said heating rod a mixing chamber, said vaporizer tube having, adjacent said mixing chamber, an inwardly projecting collar supporting said vaporizing sieve and defining a narrow annular gap around said heating rod and having, between said collar and its free end thereof, at least one circumferential row of openings providing for good air and fuel mixture and for scavenging cooling of said mixing chamber.

2. A flame glow plug according to claim 1, wherein said vaporizing tube has a second circumferential row of openings disposed parallel to said one row, the openings of said second row being circumferentially displaced with respect to the openings of said one row.

3. A flame glow plug according to claim 1, wherein said flame tube is provided at its free end with gill-like indentations formed by inwardly bent wall portions of said flame tube defining inflow openings for directing air onto the tip of said heating rod.

4. A flame glow plug according to claim 1, wherein said heating rod has, in the area where said insert structure is mounted to said plug body, longitudinal grooves extending axially with respect to said heating rod for atomizing fuel injected by said insert structure.

5. A flame glow plug according to claim 4, wherein said insert structure is a hollow jet screw mounted on said plug body so as to be displaced sidewardly with respect to the axis of said plug body such that a fuel jet emitted from said jet screw impinges said heating rod in a tangential fashion.

* * * * *